United States Patent [19]
Heithoff et al.

[11] Patent Number: 5,792,559
[45] Date of Patent: Aug. 11, 1998

[54] COMPOSITE TRANSPARENCY

[75] Inventors: Robert B. Heithoff, Gibsonia; Larry J. Shelestak, Bairdford, both of Pa.

[73] Assignee: PPG Industries, Inc., Pittsburgh, Pa.

[21] Appl. No.: 270,337

[22] Filed: Jul. 5, 1994

[51] Int. Cl.$^6$ .................... B32B 17/00; B32B 17/06; B32B 17/10; B32B 31/04
[52] U.S. Cl. .................... 428/437; 428/34; 428/426; 501/904; 501/905; 296/84.1; 156/297; 156/299
[58] Field of Search .................... 428/428, 34, 426, 428/437, 441, 442, 918; 501/53, 904, 905, 900; 296/84.1, 97.1, 97.2; 156/297, 299

[56] References Cited

U.S. PATENT DOCUMENTS

| | | | |
|---|---|---|---|
| 3,069,301 | 12/1962 | Buckley | 154/2.77 |
| 3,591,248 | 7/1971 | Jumet et al. | 350/1 |
| 3,876,552 | 4/1975 | Moynihan | 161/5 |
| 4,101,705 | 7/1978 | Fischer et al. | 428/220 |
| 4,104,076 | 8/1978 | Pons | 106/52 |
| 4,792,536 | 12/1988 | Pecoraro et al. | 501/70 |
| 4,968,454 | 11/1990 | Crano et al. | 252/586 |
| 5,023,210 | 6/1991 | Krumwiede et al. | 501/71 |
| 5,070,048 | 12/1991 | Boulos et al. | 501/71 |
| 5,077,133 | 12/1991 | Cheng | 428/426 |
| 5,085,903 | 2/1992 | Kapp et al. | 428/34.6 |
| 5,182,148 | 1/1993 | Kapp et al. | 428/34.6 |
| 5,214,008 | 5/1993 | Beckwith et al. | 501/69 |
| 5,240,886 | 8/1993 | Gulotta et al. | 501/70 |
| 5,278,108 | 1/1994 | Cheng et al. | 501/71 |

FOREIGN PATENT DOCUMENTS

| | | |
|---|---|---|
| 0 348 538 | 1/1990 | European Pat. Off. . |
| 1 400 824 | 7/1975 | United Kingdom . |

OTHER PUBLICATIONS

Coloring of Plastics (SPE Monographs), "Polyvinyl Butyral", by T. G. Webber, Chapter 17, pp. 153–158.

*Primary Examiner*—Vivian Chen
*Attorney, Agent, or Firm*—Donald C. Lepiane

[57] ABSTRACT

The present invention provides a glass composite transparency having a desired color, intensity and a high performance ratio. In particular, the transparency includes at least one rigid transparent ply, e.g. a colored glass or plastic substrate, and a member secured to a major surface of the substrate, e.g. a flexible plastic layer or a coating. The member has a color that generally complements the color of the glass substrate to reduce the overall color intensity of the composite transparency. The resulting composite transparency is gray in color and has a LTA to TSET ratio of at least 1.4, preferably with LTA ≥ 70%.

39 Claims, 2 Drawing Sheets

COMPOSITE TRANSPARENCY

BACKGROUND OF THE INVENTION

This invention relates to the production of colored composite transparencies that have desired color and solar energy transmittance characteristics. In particular, the invention relates to a transparency which reduces unwanted solar energy transfer while maintaining neutral coloration and high visible transmittance. Transparencies of the type disclosed in the present invention are highly desirable for use as glazing in buildings and motor vehicles. As used herein, the term "composite transparency" means a rigid, transparent substrate such as glass or plastic with a second element such as a flexible plastic layer, a coating or a second rigid transparent ply secured to a major surface of the substrate.

The color of an object, and in particular glass, is highly subjective. Observed color will depend on the lighting conditions and the preferences of the observer. In order to evaluate color on a quantitative basis, several color order systems have been developed. One such method of specifying color adopted by the International Commission on Illumination (CIE) uses dominant wavelength (DW) and excitation purity (Pe). The numerical values of these two specifications for a given color can be determined by calculating the color coordinates x and y from the so-called tristimulus values X, Y, Z of that color. The color coordinates are then plotted on a 1931 CIE chromaticity diagram and numerically compared with the coordinates of CIE standard illuminant C, as identified in CIE publication No. 15.2. This comparison provides a color space position on the diagram to ascertain the excitation purity and dominant wavelength of the glass color.

In another color order system, the color is specified in terms of hue and lightness. This system is commonly referred to as the CIELAB color system. Hue distinguishes colors such as red, yellow, green and blue. Lightness, or value, distinguishes the degree of lightness or darkness. The numerical values of these characteristics, which are identified as $L^*$, $a^*$ and $b^*$, are calculated from the tristimulus values (X, Y, Z). $L^*$ indicates the lightness or darkness of the color and represents the lightness plane on which the color resides. $a^*$ indicates the position of the color on a red ($+a^*$) green ($-a^*$) axis. $b^*$ indicates the color position on a yellow ($+b^*$) blue ($-b^*$) axis. When the rectangular coordinates of the CIELAB system are converted into cylindrical polar coordinates, the resulting color system is known as the CIELCH color system which specifies color in terms of lightness ($L^*$), and hue angle ($H°$) and chroma ($C^*$). $L^*$ indicates the lightness or darkness of the color as in the CIELAB system. Chroma, or saturation or intensity, distinguishes color intensity or clarity (i.e. vividness vs. dullness) and is the vector distance from the center of the color space to the measured color. The lower the chroma of the color, i.e. the less its intensity, the closer the color is to being a so-called neutral color. With respect to the CIELAB system, $C^* = (a^{*2} + b^{*2})^{1/2}$. Hue angle distinguishes colors such as red, yellow, green and blue and is a measure of the angle of the vector extending from the $a^*$, $b^*$ coordinates through the center of the CIELCH color space measured counterclockwise from the red ($+a^*$) axis. As used herein, $H°$ will be expressed as a value between 0°–360°. In FIG. 1, the CIELAB system is superimposed over the CIELCH system to illustrate the relationship between the two systems.

It should be appreciated that the color may be characterized in any of these color systems and one skilled in the art may calculate equivalent DW and Pe values; $L^*$, $a^*$, $b^*$ values; and $L^*$, $C^*$, $H°$ values from the transmittance curves of the viewed glass or composite transparency.

Typical commercial soda lime silica glass includes the following materials: 66–75 wt. % $SiO_2$, 10–20 wt. % $Na_2O$, 5–15 wt. % CaO, 0–5 wt. % MgO, 0–5 wt. % $Al_2O_3$, 0–5 wt. % $K_2O$, 0–1 wt. % BaO. To this base glass, a variety of colorants are added to produce a desired glass color. As used herein, a glass is considered to be a colored glass if its luminous transmittance (as is discussed later in more detail) is $\leq 87\%$, irrespective of total glass thickness. Glass having a luminous transmittance of >87% is considered to be clear. It should be appreciated that when a "glass" or "glass substrate" is referred to herein as colored, in the case of a composite transparency having two or more glass plies, the combined thickness of all the plies is determinative as to whether the glass or glass substrate of the transparency is colored.

Many of these colored glasses, which are well known in the art, are used in automotive and architectural applications and absorb more solar energy than clear soda lime silica glass. The primary colorant in typical green tinted glasses used in automotive applications is iron which is present in both the $Fe_2O_3$ and FeO forms. The total amount of iron present in a typical green tinted glass for automotive applications, expressed as $Fe_2O_3$ regardless of the form actually present, is about 0.5–0.9% by weight with a ratio of FeO to total iron of about 0.25–0.27. Green glasses such as those disclosed in U.S. Pat. Nos. 5,214,008 to Beckwith et al. and 5,240,886 to Gulotta use higher amounts of total iron to better absorb ultraviolet radiation and further improve the solar energy absorbing properties of the glass. U.S. Pat. No. 5,077,133 to Cheng et al. further includes ceric oxide, optionally combined with titanium oxide, to improve the glasses solar energy absorption performance. Other glasses include additional colorants such as cobalt, selenium, nickel and/or chrome to produce blue, bronze and gray colored glasses as disclosed in U.S. Pat. Nos. 4,101,705 to Fischer et al.; 4,104,076 to Pons; 4,792,536 to Pecoraro et al.; 5,023,210 to Krumwiede et al.; 5,070,048 to Boules et al. and 5,278,108 to Cheng et al.

One way of comparing the performance of various solar energy absorbing glasses is to compare the ratio of luminous transmittance to the total solar energy transmittance. Luminous transmittance, LT, is a measure of the total amount of visible light transmitted through the glass. Total solar energy transmittance, TSET, is a measure of the total amount of solar energy transmitted directly through the glass. This latter property is important because most of this transmitted energy is converted to heat after being absorbed by objects on the other side of the glass. In particular, as it applies to automotive uses, heat build-up and temperature within the vehicle are directly related to TSET. This may result in uncomfortable conditions for vehicle occupants and may require an increase in the cooling capacity of an air conditioning system. In addition, it has been shown that the heat buildup accelerates material degradation within the vehicle. As used herein, this ratio of luminous transmittance to total solar energy transmittance is referred to as the "performance ratio" (PR).

Unless otherwise noted, luminous transmittance data provided in this disclosure is measured for CIE standard illuminant A (LTA) and 2° observer over the wavelength range 380–780 nm at 10 nm intervals in accordance with ASTM 308E-90. The total solar energy transmittance data provided in this disclosure to calculate the performance ratio of a glass or composite transparency is based on Parry Moon air mass 2.0 solar data and is computed based on measured transmittance from 300–2000 nm.

To determine the TSET data, the transmittance values are integrated over the wavelength range [a,b]. This range is divided into n equal subintervals of length h by points $\{X_0, X_1, \ldots, X_n\}$ where $X_i = a + (i \times h)$. An interpolating function is used to approximate the intergrand f in each subinterval. The sum of integrals of these interpolating functions provides an approximation of the integral:

$$I = \int_a^b f(X) dX$$

In the case of calculations based on what is referred to as the Trapezoidal Rule which is used herein to calculate TSET data, f(X) is approximated on $[X_{i-1}, X_i]$ by a straight line passing through the graph of f at these points. Thus the interpolating function for f(X) is piecewise linear on [a,b], and the numerical integration formula is:

$$I = \left[ f(X_0) + 2 \sum_{i=1}^{n-1} f(X_i) + f(X_n) \right] \times h/2$$

In calculating TSET herein, the transmittance range is divided into three subranges with different intervals as follows: 300–400 nm at 5 nm intervals, 400–800 nm at 10 nm intervals and 800–2000 nm at 50 nm intervals.

FIG. 2 shows a graph illustrating the typical performance ratios of glasses using various colorants. In generating this curve, the composition of the glass was not changed but rather the thickness of the glass was varied to provide different LTA performance levels. It should be appreciated that these lines represent trends of soda-lime-silica compositions and not any one particular glass composition. Trend line 2 represents glasses typical used in automotive applications having iron as the principal colorant and are usually green or blue. Trend line 4 represents glasses having a combination of iron and other colorants, e.g. cobalt, selenium, chrome and/or nickel, and are usually blue, bronze or gray. Trend line 6 represents glasses that use colorants other than iron, e.g. cobalt and nickel, and are usually gray or bronze. As can be seen, glasses which use iron as the principal colorant generally will have the highest performance ratio, indicating that for a given LTA, there is a lower TSET and therefore less total energy passing through the glass. In terms of automotive transparencies applications, this translates into less heat buildup within the vehicle. The higher performance ratio of these glasses is primarily due to the greater amount of iron, and in particular FeO, as a colorant. More particularly, although colorants in general absorb solar energy in the visible range as well as a portion of the infrared and/or ultraviolet energy. FeO is the most effective in absorbing non-visible solar energy and transmitting visible energy.

In automotive applications, governmental regulations establish the minimum value for luminous transmittance. In the United States, for passenger cars, LTA must be at least 70%. Glasses which have an LTA of at least 70% and a TSET of no greater than 50% are referred to herein as "high performance, solar control glasses." The performance ratio for such glass is at least 1.4. At present, some automotive manufacturers require the TSET to be less than 45%, resulting in a performance ratio of at least 1.55 at LTA=70%.

As known in the prior art, colorants may also be added to the basic iron containing soda-lime-silica glass composition to reduce the color intensity in the glass, and in particular to produce a neutral gray glass. As used herein, the term "gray" means a glass or composite transparency color having an equivalent C* value of no greater than 4 at L*=88. It should be appreciated that for a different L* value, given the transmission vs. wavelength curve for the glass or transparency, one skilled in the art may calculate the equivalent C* value which corresponds to gray as defined herein. For example, for a glass or transparency having an L* value slightly less than 88, the C* value will be greater than 4 and for a glass or transparency having an L* value slightly greater than 88, the C* value will be less than 4. It should be further appreciated that if two such gray composite transparencies are viewed simultaneously, there may be a perceived difference in color, but when viewed individually, each will appear to be gray.

In principal, colorants added to a base glass composition to produce a gray colored glass produce colors that are the color complement of the base glass color. For example, to provide a complement to iron containing green glass, a single purple colorant is preferred, but no such glass colorant exists in combination with iron at a redox ratio of 0.25–0.27. Similarly, to provide a complement to iron containing blue glass, a single orange colorant is preferred, but no such glass colorant exists in combination with iron at a redox ratio of 0.50–0.60. Therefore, combinations of colorants, e.g. combinations of cobalt and selenium, must be added to the base glass composition to produce a gray colored glass. However, addition of multiple colorants requires a reduction in iron content in order to maintain a constant visible transmittance. Since these additional colorants are less powerful than FeO in absorbing solar energy, TSET will increase and the performance ratio will decrease, e.g. as shown in FIG. 2 for the glasses which include iron, cobalt and selenium (trend line 4) as colorants. More particularly, for an LTA of 70%, the TSET for commercially available gray glasses typically ranges from 57–68%, which results in a performance ratio of about 1.03–1.23.

It is known that colored interlayer material may be combined with glass plies to produce a desired color. For example, bronze colored interlayer may be laminated between a pair of clear glass plies to produce a bronze colored automotive windshield. In addition, systems such as the Saflex OptiColor® interlayer system from Monsanto Co., St. Louis, Mo., laminate multiple plies of different colored interlayer between clear, tinted or reflective glass plies to produce a desired glass color. However, these interlayers when combined with ⅛ inch thick clear glass produce laminates having a performance ratio generally less than 1.22 at LTA=70%. Furthermore, such a system does not provide the ability to control the color and intensity of the composite transparency while maintaining a high performance ratio. For these systems, it is recommended that added solar control be accomplished using a darker color interlayer. However, this arrangement will reduce LTA more than TSET, and in turn reduce the performance ratio of the composite transparency.

In addition, it is common in automotive windshields to tint an upper portion of its polyvinyl butyral interlayer, typically referred to as the shade band, to reduce luminous transmittance along the upper edge of the windshield. However, the localized use of the shade band does not provide color and intensity control throughout the transparency, nor does it provide the transparency with a high performance ratio. More specifically, the performance ratio at the shade band area in an automotive windshield constructed of two plies of 2.1 mm thick Solex® glass is <1. Solex® glass is a green tinted automotive glass available from PPG Industries, Inc., Pittsburgh, Pa.

It would be advantageous to be able to produce a composite transparency having a high performance ratio, i.e. superior solar energy transmittance characteristics, while providing a high level of luminous transmittance, in a variety of different colors and intensities without having to change the basic glass composition. In particular, it would be advantageous to produce a neutral gray colored composite transparency having a performance ratio of 1.4 and higher.

SUMMARY OF THE INVENTION

The present invention provides a composite transparency having a desired color and intensity level and a high performance ratio. In particular, the composite transparency includes at least one rigid transparent ply, e.g. a colored glass or plastic substrate, and a member secured to a major surface of the substrate, e.g. a plastic layer or a coating, and has a performance ratio of at least 1.4. The member has a color that generally complements the color of the substrate to reduce the overall intensity of the transparency. In one embodiment of the invention, the transparency is gray in color, and in particular is an automotive windshield.

DETAILED DESCRIPTION OF THE INVENTION

Figure 1:
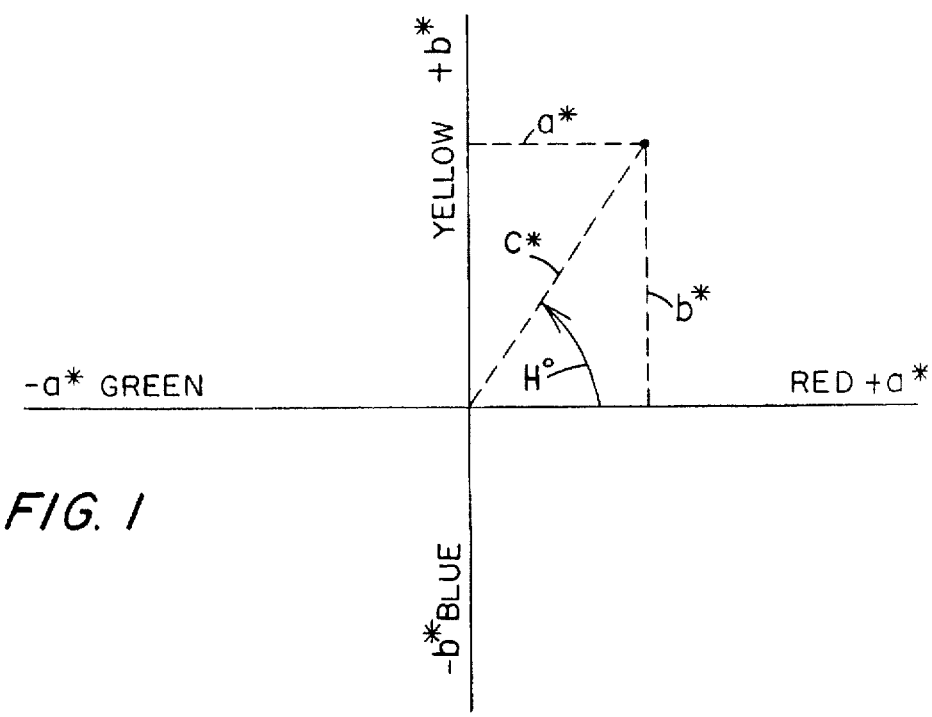
FIG. 1 is an illustration of the color space in the CIELAB and CIELCH color systems.
Figure 2:
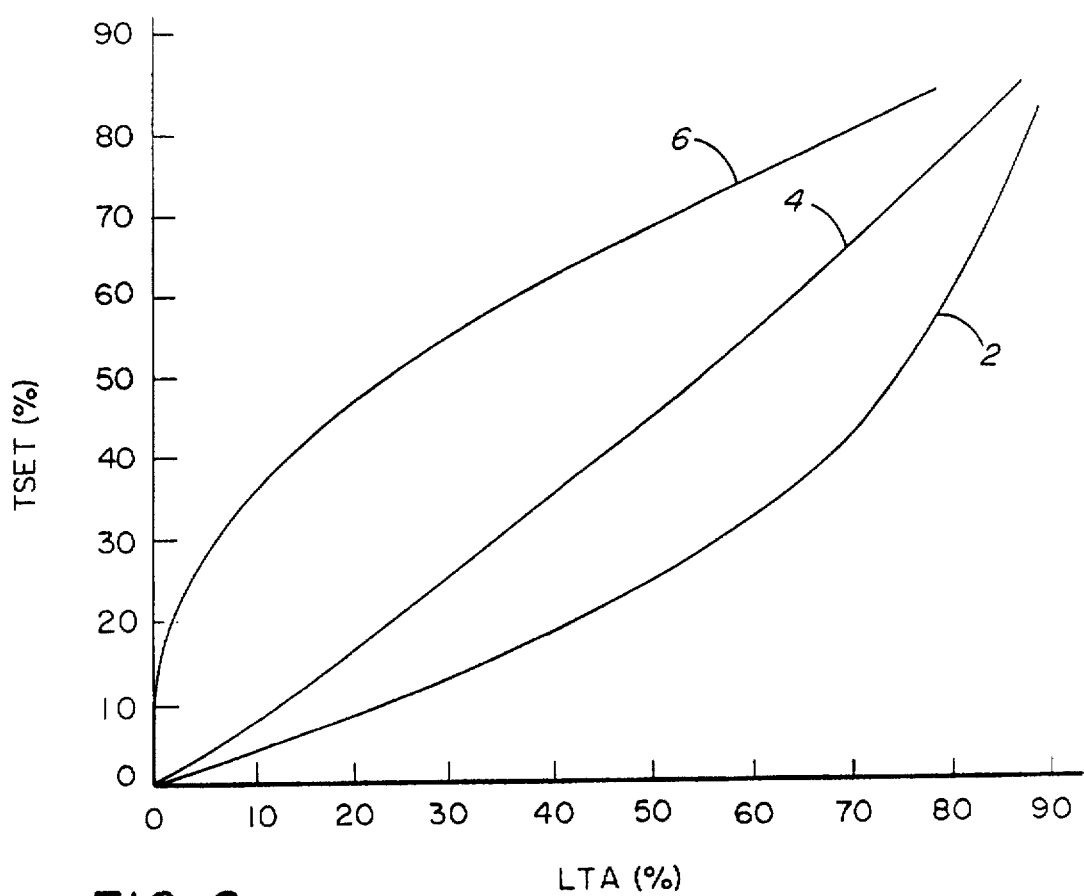
FIG. 2 is a plot of luminous transmittance (LTA) versus total solar energy transmittance (TSET) for various types of glasses used in automotive and architectural applications.

The present invention produces a high performance, solar control composite transparency which incorporates at least one high performance, solar control glass substrate and a member which reduces the color intensity of the glass substrate while maintaining a high performance ratio. In one embodiment of the invention, the member is a plastic material layer secured to the glass substrate. As used herein, "plastic" is meant to include any of the common thermoplastic or thermosetting synthetic nonconductive materials, e.g. vinyl resins, polyethylene, polypropylene, thermoplastic urethane, thermoplastic olefin, polycarbonate, and the like. The plastic layer is preferably a flexible plastic layer, e.g. polyvinyl butyral (PVB). Colorants may be incorporated into PVB formulations which are highly selective in absorbing specific wavelength regions and provide a desired color. Such material is available from suppliers such as Monsanto Company, St. Louis, Mo. In the present invention, the color of the plastic layer generally is the complement of the glass substrate and includes colorants which, when the plastic layer is laminated to the glass substrate, reduce the color intensity of the composite, as will be discussed later in more detail. It should be appreciated that other rigid transparent substrates, e.g. polycarbonate or other plastic sheet material may be used in place of, or in combination with, a glass ply.

Tables 1 and 2 present computer generated data based on combining tinted polyvinyl butyral layers with two colored glass plies (individually and collectively referred to as the "substrate") to produce a composite transparency having a color different from that of the glass plies and/or to reduce the intensity of the glass while generally maintaining a performance ratio comparable to that of high performance, solar control glass. The information in these tables was generated from a computer model which calculates color and spectral performance of transparent materials. The tables include the total glass thickness (t), luminous transmittance (LTA), total solar energy transmittance (TSET), performance ratio (PR), dominant wavelength (DW), purity (Pe) and the coordinates for the individual substrate and PVB layer as well as the composite in the CIELAB and CIELCH color spaces. The DW and Pe values are based on CIE standard illuminant C and 2° observer. The L*, a*, b*, C* and H° values are based on CIE standard illuminant D65 and 10° observer. In each set of examples, the amount of colorant in the PVB layer was changed to affect the desired color. In addition, in order to provide a basis of comparison between the same group of composite transparencies, visible transmittance (LTA) for each transparencies was adjusted to 71%. It should be appreciated that in order to meet this comparison level of performance, the total thickness of the glass and/or the concentration of the colorants in the glass may be changed. It is generally desirable that the glass ply thickness for automotive laminates, e.g. windshields and sunroofs, be between 1.5–3.0 mm, and for single ply automotive side and back windows be between 3.0–7.0 mm. In architectural glass applications, the glass ply thickness is typically between 3.0–10.0 mm. An LTA value of 71% was chosen for comparison because it is expected that upon long term exposure to solar radiation, the LTA of a composite transparency will decrease up to 1%. LTA of 71% should ensure continued solar performance that meets governmental requirements for automotive applications.

TABLE 1

|  | Comp. Trans. 10 | | | Comp. Trans. 12 | | | Comp. Trans. 14 | | | Comp. Trans. 16 | | |
| --- | --- | --- | --- | --- | --- | --- | --- | --- | --- | --- | --- | --- |
|  | Glass | PVB | Trans. | Glass | PVB | Trans. | Glass | PVB | Trans. | Glass | PVB | Trans. |
| t (in.) | 0.1920 | 0.030 | 0.2220 | 0.1817 | 0.030 | 0.2117 | 0.1675 | 0.030 | 0.1975 | 0.1515 | 0.030 | 0.1815 |
| LTA (%) | 71.4 | 91.1 | 71.0 | 72.4 | 89.9 | 71.0 | 73.7 | 88.4 | 71.0 | 75.2 | 86.6 | 71.0 |
| TSET (%) | 43.5 | 88.2 | 42.2 | 44.9 | 87.7 | 43.2 | 47.0 | 86.9 | 44.7 | 49.5 | 86.0 | 46.4 |
| PR | 1.64 | 1.03 | 1.68 | 1.61 | 1.03 | 1.64 | 1.57 | 1.02 | 1.59 | 1.52 | 1.01 | 1.53 |
| DW (nm) | 511.9 | 572.9 | 512.9 | 511.9 | 504.6c | 512.7 | 511.9 | 509.3c | 512.0 | 512.0 | 510.5c | 511.5 |
| Pe | 2.61 | 0.24 | 2.62 | 2.47 | 1.10 | 1.96 | 2.28 | 2.37 | 1.25 | 2.06 | 3.70 | 0.47 |
| L* | 88.5 | 96.4 | 88.3 | 88.9 | 95.8 | 88.1 | 89.5 | 94.9 | 87.8 | 90.1 | 94.0 | 87.6 |
| a* | −8.52 | −0.10 | −8.60 | −8.11 | 1.88 | −6.30 | −7.53 | 3.86 | −3.79 | −6.87 | 5.97 | −1.06 |
| b* | 3.41 | 0.32 | 3.56 | 3.25 | −0.47 | 2.64 | 3.02 | −1.30 | 1.62 | 2.77 | −2.13 | 0.55 |
| C* | 9.18 | 0.33 | 9.31 | 8.73 | 1.93 | 6.83 | 8.11 | 4.07 | 4.12 | 7.40 | 6.34 | 1.19 |
| H° | 158 | 107 | 158 | 158 | 346 | 157 | 158 | 341 | 157 | 158 | 340 | 153 |

TABLE 1-continued

|  | Comp. Trans. 18 | | | Comp. Trans. 20 | | | Comp. Trans. 22 | | | Comp. Trans. 24 | | |
| --- | --- | --- | --- | --- | --- | --- | --- | --- | --- | --- | --- | --- |
|  | Glass | PVB | Trans. | Glass | PVB | Trans. | Glass | PVB | Trans. | Glass | PVB | Trans. |
| t (in.) | 0.1183 | 0.030 | 0.1483 | 0.1000 | 0.030 | 0.1300 | 0.1450 | 0.030 | 0.1750 | 0.1374 | 0.030 | 0.1674 |
| LTA (%) | 78.5 | 82.8 | 71.0 | 80.4 | 80.8 | 71.0 | 75.9 | 86.0 | 71.0 | 76.6 | 85.2 | 71.0 |
| TSET (%) | 55.6 | 84.0 | 50.8 | 59.6 | 82.8 | 53.6 | 50.6 | 84.9 | 46.6 | 52.0 | 83.7 | 47.0 |
| PR | 1.41 | 0.99 | 1.40 | 1.35 | 0.98 | 1.32 | 1.50 | 1.01 | 1.52 | 1.47 | 1.02 | 1.51 |
| DW (nm) | 512.2 | 444.3 | 488.5 | 512.4 | 479.4 | 488.1 | 512.0 | 617.3 | 575.3 | 512.0 | 593.7 | 576.6 |
| Pe | 1.61 | 2.99 | 3.48 | 1.36 | 5.11 | 5.79 | 1.97 | 3.54 | 4.22 | 1.87 | 6.57 | 7.13 |
| L* | 91.5 | 93.0 | 88.0 | 92.3 | 92.6 | 88.4 | 90.4 | 93.2 | 87.1 | 90.7 | 92.6 | 86.8 |
| a* | −5.45 | 2.03 | −3.34 | −4.65 | −1.29 | −5.74 | −6.59 | 7.20 | 0.50 | −6.27 | 7.29 | 0.99 |
| b* | 2.22 | −4.13 | −1.84 | 1.91 | −5.19 | −3.15 | 2.66 | 1.77 | 3.95 | 2.53 | 4.79 | 6.58 |
| C* | 5.89 | 4.60 | 3.81 | 5.03 | 5.35 | 6.55 | 7.11 | 7.42 | 3.98 | 6.77 | 8.72 | 6.65 |
| H° | 158 | 296 | 209 | 158 | 256 | 209 | 158 | 14 | 83 | 158 | 33 | 81 |

|  | Comp. Trans. 26 | | | Comp. Trans. 28 | | | Comp. Trans. 30 | | |
| --- | --- | --- | --- | --- | --- | --- | --- | --- | --- |
|  | Glass | PVB | Trans. | Glass | PVB | Trans. | Glass | PVB | Trans. |
| t (in.) | 0.1415 | 0.030 | 0.1715 | 0.1297 | 0.030 | 0.1597 | 0.0718 | 0.030 | 0.1018 |
| LTA (%) | 76.2 | 85.6 | 71.0 | 77.4 | 84.3 | 71.0 | 83.4 | 78.0 | 71.0 |
| TSET (%) | 51.3 | 84.8 | 47.2 | 53.4 | 84.6 | 49.1 | 66.6 | 80.7 | 58.3 |
| PR | 1.49 | 1.01 | 1.50 | 1.45 | 1.00 | 1.45 | 1.25 | .097 | 1.22 |
| DW (nm) | 512.0 | 493.8c | 581.1 | 512.1 | 510.7c | 511.0c | 513.0 | 562.5c | 465.4 |
| Pe | 1.93 | 3.59 | 3.27 | 1.76 | 5.49 | 1.42 | 0.96 | 5.33 | 3.93 |
| L* | 90.5 | 93.0 | 87.0 | 91.0 | 92.7 | 87.2 | 93.5 | 90.6 | 87.6 |
| a* | −6.45 | 8.30 | 1.69 | −5.95 | 8.82 | 2.68 | −3.39 | 5.16 | 1.81 |
| b* | 2.60 | 0.52 | 2.74 | 2.41 | −3.20 | −0.86 | 1.43 | −6.42 | −4.95 |
| C* | 6.95 | 8.32 | 3.22 | 6.41 | 9.39 | 2.81 | 3.67 | 8.23 | 5.27 |
| H° | 158 | 4 | 58 | 158 | 340 | 342 | 157 | 309 | 290 |

Referring to Table 1, green glass substrates are combined with 0.030 inch (0.76 mm) thick PVB layers to form glass/plastic composite transparencies. Green glass may be generally characterized as having a wavelength between 490–560 nm, depending on the lighting conditions and the perceptions of the observer. This range is generally equivalent to a hue angle range of 120°–200°. The green glass substrate used in Table 1 is a high performance, solar control glass available from PPG Industries, Inc. and sold under the trademark SOLARGREEN®. At an LTA level of 71%, the TSET of this glass is 42.9%, resulting in a performance ratio of 1.65. The dominant wavelength of this glass substrate is 512 nm and its color as described in the CIELAB color system is L*=88.3, a*=−8.7, b*=3.5 and C*=9.4. In addition, the hue angle of the substrate is 158. It should be appreciated that although the color of the particular substrate used in Table 1 is characterized as "green," this glass includes a slight yellowish coloration as is apparent from its a*, b* coordinates. In addition, although green glass is generally characterized as glass having a hue angle from 120°–200°, in the present invention it is preferred that a green glass substrate have a hue angle between 140°–190°, and most preferably between 150°–180°.

An object of the present invention is to reduce the intensity of the substrate and more particularly to provide a gray colored composite transparency having a performance ratio of at least 1.4. To this end, referring to Table 1 and FIG. 3, a clear PVB layer and three different tinted PVB layers, each successive tinted layer having an increasing amount of colorant to provide a color which complements that of the glass substrate, are combined with the green glass substrate to produce four composite transparencies 10, 12, 14 and 16, respectively, with the last three transparencies each having a color different from that of the original glass substrate while maintaining a high performance ratio. As used herein, the term "complement" means a color having a hue angle equal to that of the substrate plus 180°±45°, preferably ±30°, and most preferably ±20°. Accordingly, although not required in the present invention, a plastic layer having a color that complements that of a substrate preferably falls approximately on the opposite side of the CIELAB color space from the substrate. More particularly, if the substrate color falls in the upper left quadrant of FIGS. 1 and 3 bounded by the green and yellow axes, the complementing color will fall in the lower right quadrant bounded by the red and blue axes. For a green glass substrate presented in Table 1 which has a hue angle of 158°, the complementing plastic layer will generally have a purple color. In the particular embodiments of the invention shown in Table 1, the hue angle for the plastic layer in composite transparencies 12, 14 and 16 varies between 340°–346°.

Figure 3:
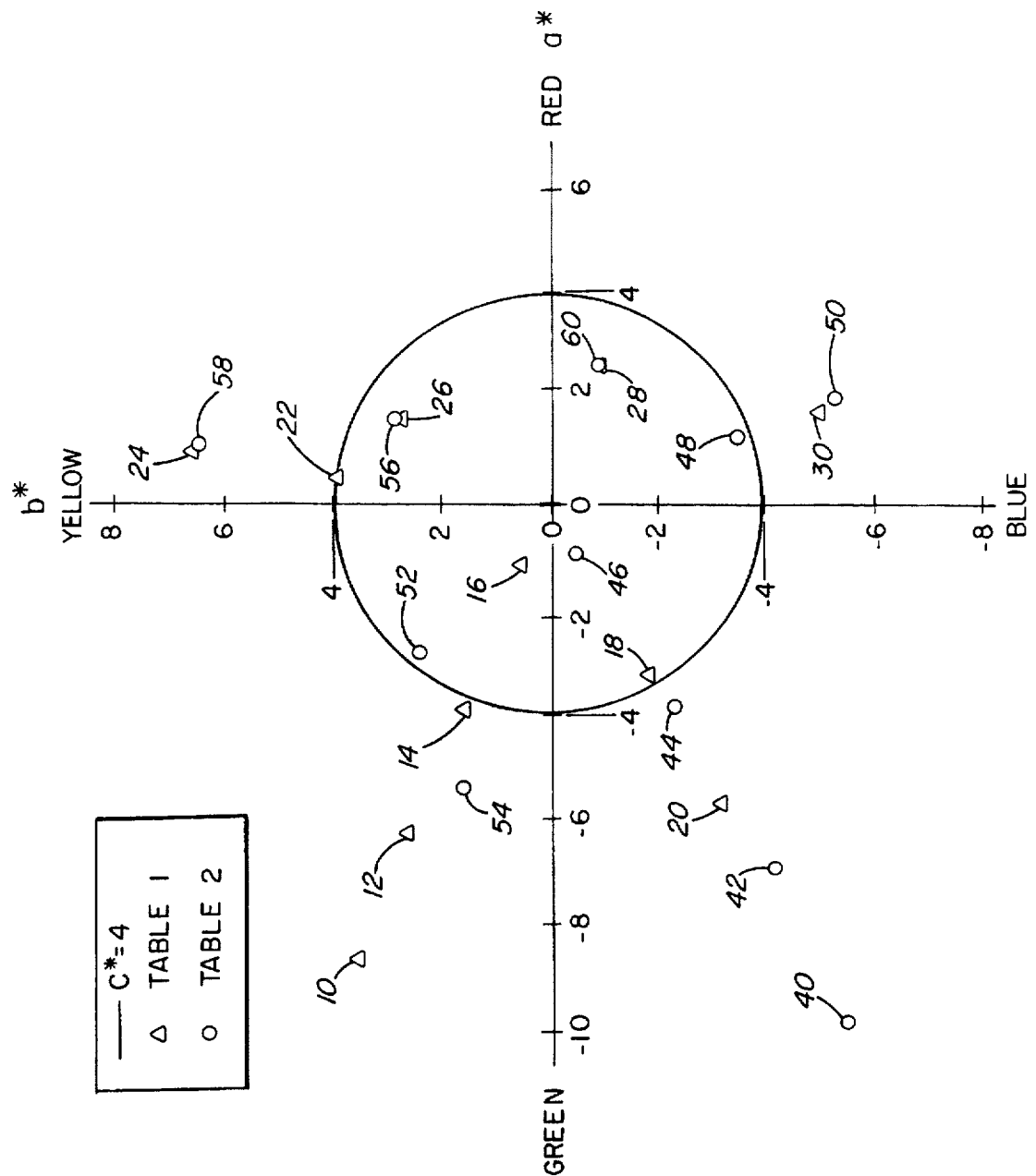
FIG. 3 is a plot of composite transparency examples incorporating the present invention in CIELAB color space.

Referring to FIG. 3, composite transparencies 10, 12, 14 and 16 are located in the CIELAB color space. In composite transparency 12, the first tinted layer produces a transparency having a chromaticity of C*=6.83. The color of composite transparency 12 is still basically green but the addition of the tinted layer has reduced its chromaticity as compared to composite transparency 10, which incorporates a clear plastic layer, and has made the final product more neutral in color. The composite transparency 14 incorporates a tinted layer which further reduces the chromaticity of the transparency and the third tinted layer incorporated into composite transparency 16 reduces the chromaticity to C*=1.19. At this level of intensity, the transparency appears to be neutral gray in color.

As can be seen from Table 1 and FIG. 3, by using a tinted layer having a hue angle which generally complements that of the glass substrate and increasing the amount of colorants in the tinted layer to reduce the chromaticity of the substrate, one may produce a composite transparency using a green glass substrate which has a neutral gray color yet has a performance ratio which is higher than that of any currently available gray glass composition, and more particularly a performance ratio greater than 1.4. More specifically, for the gray composite transparency 16, C*=1.19 and the performance ratio is 1.53. It should be appreciated that the composite transparencies illustrated in Table 1 are for one specific glass composition and that one skilled in the art could formulate tinted interlayer compositions which color generally complement any other green glass composition color to reduce the intensity of the glass substrate.

In addition, one skilled in the art would appreciate that the color of the tinted plastic layer may be changed to customize the desired color of the transparency. More particularly, as presented in Table 1, the glass substrate has a hue angle of 158° and the tinted plastic layer for composite transparencies 12, 14 and 16 has a complementing hue angle of approximately 340°. However, if the hue angle of the plastic layer is less than the complement of the substrate hue angle, the color of the transparency would tend to be greenish blue while still reducing the overall chromaticity of the transparency as compared to the substrate. More particularly, in composite transparencies 18 and 20, the PVB layer has a hue angle of 296° and 256°, respectively. Referring to FIG. 3, these transparencies are green-blue in color with composite transparency 18 being a green-blue gray. Similarly, if the hue angle of the plastic layer combined with the substrate is greater than the complement of the substrate hue angle, the transparency would tend to be greenish yellow to yellow in color while still reducing the overall chromaticity of the transparency as compared to the substrate. More particularly, in composite transparencies 22 and 24, the PVB layer has a hue angle of 14° and 33°, respectively. Referring to FIG. 3, these transparencies are yellow in color with composite transparency 22 being a yellow gray.

Composite transparencies 26 and 28 are additional examples of how a green glass substrate may be combined with a tinted plastic layer to provide a different colored transparency with a high performance ratio. More particularly, composite transparency 26 is a bronze gray colored transparency with a performance ratio of 1.5 and composite transparency 28 is a purple gray colored transparency with a performance ratio of 1.45. Composite transparency 30 is a third example wherein the transparency is purple in color with a performance ratio of 1.22.

TABLE 2

|  | Comp. Trans. 40 | | | Comp. Trans. 42 | | | Comp. Trans. 44 | | | Comp. Trans. 46 | | |
| --- | --- | --- | --- | --- | --- | --- | --- | --- | --- | --- | --- | --- |
|  | Glass | PVB | Trans. | Glass | PVB | Trans. | Glass | PVB | Trans. | Glass | PVB | Trans. |
| t (in.) | 0.1870 | 0.030 | 0.2170 | 0.1709 | 0.030 | 0.2009 | 0.1531 | 0.030 | 0.1831 | 0.1358 | 0.030 | 0.1658 |
| LTA (%) | 71.4 | 91.1 | 71.0 | 72.9 | 89.4 | 71.0 | 74.6 | 87.5 | 71.0 | 76.3 | 85.7 | 71.0 |
| TSET (%) | 40.5 | 88.2 | 39.1 | 42.5 | 87.1 | 40.1 | 44.9 | 857 | 41.4 | 47.7 | 84.2 | 42.9 |
| PR | 1.76 | 1.03 | 1.81 | 1.72 | 1.03 | 1.77 | 1.66 | 1.02 | 1.72 | 1.60 | 1.02 | 1.66 |
| DW (nm) | 487.7 | 572.9 | 487.9 | 487.7 | 595.1 | 487.7 | 487.8 | 594.6 | 488.2 | 487.8 | 594.4 | 490.7 |
| Pe | 9.96 | 0.24 | 9.88 | 9.15 | 1.75 | 7.36 | 8.24 | 3.77 | 4.27 | 7.34 | 5.83 | 1.12 |
| L* | 89.4 | 96.4 | 89.2 | 90.0 | 95.3 | 88.7 | 90.7 | 94.1 | 88.2 | 91.3 | 93.0 | 87.6 |
| a* | −9.80 | −0.10 | −9.90 | −9.06 | 2.14 | −6.98 | −8.21 | 4.46 | −3.89 | −7.37 | 6.71 | −0.83 |
| b* | −5.68 | 0.32 | −5.49 | −5.23 | 1.29 | −4.19 | −4.72 | 2.74 | −2.35 | −4.22 | 4.20 | −0.47 |
| C* | 11.33 | 0.33 | 11.32 | 10.46 | 2.50 | 8.14 | 9.47 | 5.23 | 4.54 | 8.49 | 7.92 | 0.96 |
| H° | 210 | 107 | 209 | 210 | 31 | 211 | 210 | 32 | 211 | 210 | 32 | 209 |
|  | Comp. Trans. 48 | | | Comp. Trans. 50 | | | Comp. Trans. 52 | | | Comp. Trans. 54 | | |
|  | Glass | PVB | Trans. | Glass | PVB | Trans. | Glass | PVB | Trans. | Glass | PVB | Trans. |
| t (in.) | 0.1321 | 0.030 | 0.1621 | 0.1330 | 0.030 | 0.1630 | 0.1397 | 0.030 | 0.1697 | 0.1520 | 0.030 | 0.1820 |
| LTA (%) | 76.7 | 85.3 | 71.0 | 76.6 | 85.4 | 71.0 | 75.9 | 86.1 | 71.0 | 74.7 | 87.4 | 71.0 |
| TSET (%) | 48.3 | 84.5 | 43.8 | 48.1 | 84.9 | 43.9 | 47.0 | 83.9 | 42.0 | 45.1 | 85.0 | 40.9 |
| PR | 1.59 | 1.01 | 1.62 | 1.59 | 1.01 | 1.62 | 1.62 | 1.03 | 1.69 | 1.66 | 1.03 | 1.74 |
| DW (nm) | 487.8 | 493.0c | 469.6 | 487.8 | 497.3c | 466.6 | 487.8 | 584.4 | 544.0 | 487.8 | 581.8 | 504.3 |
| Pe | 7.15 | 3.53 | 2.86 | 7.20 | 4.65 | 4.21 | 7.55 | 8.45 | 1.71 | 8.18 | 7.39 | 2.04 |
| L* | 91.5 | 92.8 | 87.6 | 91.4 | 92.9 | 87.7 | 91.2 | 93.1 | 87.6 | 90.7 | 94.0 | 88.0 |
| a* | −7.19 | 8.59 | 1.30 | −7.23 | 9.28 | 1.98 | −7.56 | 4.93 | −2.89 | −8.16 | 2.99 | −5.42 |
| b* | −4.11 | 0.96 | −3.51 | −4.14 | −0.85 | −5.28 | −4.34 | 7.32 | 2.44 | −4.69 | 6.78 | 1.59 |
| C* | 8.28 | 8.64 | 3.74 | 8.33 | 9.32 | 5.64 | 8.72 | 8.82 | 3.78 | 9.41 | 7.41 | 5.64 |
| H° | 210 | 6 | 290 | 210 | 355 | 291 | 210 | 56 | 140 | 210 | 66 | 164 |
|  | Comp. Trans. 56 | | | Comp. Trans. 58 | | | Comp. Trans. 60 | | | | | |
|  | Glass | PVB | Trans. | Glass | PVB | Trans. | Glass | PVB | Trans. | | | |
| t (in.) | 0.1190 | 0.030 | 0.1490 | 0.1158 | 0.030 | 0.1458 | 0.1215 | 0.030 | 0.1515 | | | |
| LTA (%) | 78.0 | 83.9 | 71.0 | 78.4 | 83.6 | 71.0 | 77.8 | 84.1 | 71.0 | | | |
| TSET (%) | 50.7 | 82.2 | 44.2 | 51.3 | 81.3 | 44.1 | 50.2 | 83.1 | 44.5 | | | |
| PR | 1.54 | 1.02 | 1.60 | 1.53 | 1.03 | 1.61 | 1.55 | 1.01 | 1.59 | | | |
| DW (nm) | 487.9 | 590.6 | 580.8 | 487.9 | 585.6 | 576.7 | 487.8 | 605.7 | 512.6c | | | |
| Pe | 6.47 | 9.24 | 3.34 | 6.30 | 12.67 | 6.96 | 6.60 | 5.76 | 1.40 | | | |
| L* | 91.9 | 91.8 | 87.0 | 92.1 | 91.4 | 86.8 | 91.8 | 92.0 | 87.2 | | | |
| a* | −6.53 | 8.49 | 1.72 | −6.37 | 7.76 | 1.68 | −6.66 | 9.53 | 2.71 | | | |
| b* | −3.72 | 7.11 | 2.84 | −3.63 | 10.70 | 6.42 | −3.80 | 3.37 | −0.87 | | | |
| C* | 7.52 | 11.08 | 3.32 | 7.33 | 13.22 | 6.51 | 7.67 | 10.11 | 2.85 | | | |
| H° | 210 | 40 | 59 | 210 | 54 | 80 | 210 | 19 | 342 | | | |

Referring to Table 2, a high performance, solar control composite transparency similar to that discussed above in Table 1, may be produced using a blue glass substrate. Blue colored glass may be characterized as having a dominant wavelength between 450–490 nm, depending on the lighting conditions and perceptions of the observer. This range is generally equivalent to a hue angle range of 200°–300°. In particular, the glass substrate used in Table 2 is a blue glass available from PPG Industries, Inc. and sold under the trade name SOLEXTRA®. As in Table 1, one clear and three different tinted polyvinyl butyral layers which complement the color of the blue substrate are combined with the blue glass substrate to illustrate how the color of the transparency may be changed from a blue color to a blue gray to a gray colored composite transparency while maintaining a high performance ratio. At an LTA of 71%, this glass substrate has a TSET of 40.0% and a performance ratio of 1.78. The dominant wavelength of the blue substrate is 488 nm and its color is characterized in the CIELAB color system as L*=89.3, a*=−10.0, b*=−5.8, C*=11.6, and H°=210°. It should be appreciated that although the color of the substrate is characterized as "blue," the glass includes a slight greenish coloration as is apparent from its a*, b* coordinates. In addition, although blue glass is generally characterized as glass having a hue angle from 200°–300°, in the present invention it is preferred that a blue glass substrate have a hue angle between 200°–240°, and most preferably between 200°–220°.

Referring to Table 2 and FIG. 3, this substrate with one clear and the three tinted PVB layers is identified as composite transparencies 40, 42, 44 and 46, respectively. For the blue glass substrate presented in Table 2 which has a hue angle of 210°, the complementing plastic layer will generally have an orange color. As can be seen from Table 2, the tinted plastic layer in composites transparencies 42, 44 and 46 has a hue angle of about 32°. Depending upon the amount of colorants in the tinted layer, the chromaticity of the transparency is reduced until composite transparency 46 is gray in color but still has a performance ratio higher than that available for gray glass compositions. More particularly, in composite transparency 42, the first tinted layer reduces the chromaticity of the transparency to C*=8.14. The color of the transparency is still basically blue but the addition of the tinted layer has reduced the chromaticity of composite transparency 42 as compared to composite transparency 40, which incorporates a clear plastic layer, and has made the final product more neutral in color. Composite transparency 44 incorporates a tinted layer which further reduces the chromaticity of the transparency as compared to composite transparency 42 and the third tinted layer incorporated into composite transparency 46 reduces the chromaticity to C*=0.96. At this level of intensity, composite transparency 46 appears to be neutral gray in color.

As with the composite transparencies in Table 1, the color of the tinted plastic layer used with the blue glass substrate in Table 2 may be changed to customize the desired color of the transparency. More particularly, referring to Table 2, the glass substrate has a hue angle of 210° and the tinted plastic layer in composite transparencies 42, 44 and 46 has a complementing hue angle of approximately 32°. However, if the hue angle of the plastic layer is less than the complement of the substrate hue angle, the color of the transparency would tend to be bluish red while still reducing the overall chromaticity of the transparency as compared to the substrate. More particularly, in composite transparencies 48 and 50, the PVB layer has a hue angle of 6° and 355°, respectively. Referring to FIG. 3, these transparencies are blue-red in color with composite transparency 48 being a blue-red gray. Similarly, if the hue angle of the plastic layer combined with the substrate is greater than the complement of the substrate hue angle, the color of the transparency would tend to be bluish green while still reducing the overall chroma-ticity of the transparency as compared to the substrate. More particularly, in composite transparencies 52 and 54, the PVB layer has a hue angle of 56° and 66°, respectively. Referring to FIG. 3, these transparencies are blue-green in color with composite transparency 52 being a blue-green gray color.

Composite transparencies 56, 58 and 60 are additional examples of how a blue glass substrate may be combined with a tinted plastic layer to provide a different colored transparency with a high performance ratio. More particularly, composite transparencies 56 and 58 are bronze gray colored transparency with a performance ratio of about 1.6. When comparing the color of these transparencies, composite transparency 56 will appear to be more gray than composite transparency 58. Composite transparency 60 is a purple gray colored transparency with a performance ratio of 1.59.

The composite transparencies presented in Tables 1 and 2 include specific high performance, solar control green or blue colored substrate compositions combined with complementing purple or orange PVB layer(s), respectively. However, it should be appreciated that the present invention is not limited to use solely with high performance glasses or any particular glass color but may be used with any substrate in order to reduce its intensity. Tinted plastic material may be produced to reduce the intensity of any colored substrate as discussed earlier and in particular to produce a gray composite transparency. For example, if the glass color is an objectionable green color, a tinted plastic layer may be combined with the glass in order to reduce the chromaticity of the transparency and provide a more neutral green color and if desired, to reduce the chromaticity of the transparency to provide a gray colored composite transparency as shown in the progressive change in color of composite transparencies 10, 12, 14 and 16 and illustrated in FIG. 3.

Although the preferred composite transparencies of the present invention includes a glass substrate and a tinted plastic layer to reduce the chromaticity of the transparency as compared to the glass substrates to produce a more neutral color, and in the instances of solar control glass to maintain a high performance ratio of such a transparency, this end result may be obtained in other ways. In particular, rather than using a tinted plastic layer, a coating or film may be applied to a major surface of a plastic layer or a major surface of the glass substrate. In particular, with a green glass substrate, a purple coating (i.e. a coating having a hue angle which generally complements that of the glass substrate) may be applied to a plastic layer which is subsequently combined with the glass substrate, or as an alternative directly to the glass surface to produce a more neutral colored transparency and if desired, a gray composite transparency. The coating may be applied in any of a number of well known conventional techniques for applying a coating or film on plastic or glass. While not required, it is desired that the coating incorporate materials that are highly absorbent in specific wavelength regions to maximized the performance ratio. Although not limiting in the present invention, for combination with a green substrate, such a coating may be a lightly tinted thermoset acrylic coating as disclosed in U.S. Pat. Nos. 5,085,903 and 5,182,148 to Kapp et al. Such a coating would incorporate red and violet dyes to produce the required purple color to complement the green substrate. Orange (or red and yellow) dyes may be used to complement a blue glass substrate.

As another alternative, two transparent plies having complementing colors may be laminated together to produce the same effect. More particularly, a green glass substrate may be laminated to a complementing purple colored glass to produce a more neutral or gray composite transparency. Such a purple glass may be a highly oxidized glass which utilizes $Mn^{+3}$ as a colorant.

It should be appreciated that the composite transparency disclosed in the present invention may include a single glass ply as well as multiple glass ply construction, as is typical in automotive side and back window, windshield and sunroof construction. In addition, the composite transparency may also incorporate substrates having different colors and/ or solar performance characteristics. For example, an automotive windshield may combine two high performance, solar control glass plies, or as an alternative, combine a high performance, solar control ply with a lower performance glass ply, or even a clear glass ply, with a complementing polyvinyl butyral interlayer to produce a gray colored windshield having a performance ratio of over 1.4. It should be further appreciated that a colored glass ply may be combined with combinations of coatings, plastic layers and/or additional rigid plies to provide the desired color and intensity while maintaining a high performance ratio. Furthermore, other rigid substrates may also be used in place of a glass substrate. For example, a polycarbonate ply or other rigid plastic sheet material may be used in place of or in combination with a glass ply.

TABLE 3

|         | Comp. Trans. 70 |        |        | Comp. Trans. 72 |        |        |
|---------|-------|--------|--------|-------|--------|--------|
|         | Glass | PVB    | Trans. | Glass | PVB    | Trans. |
| t (in.) | 0.867 | 0.030  | 0.897  | 0.852 | 0.030  | 0.882  |
| LTA (%) | 31.2  | 62.5   | 20.0   | 33.1  | 67.1   | 20.0   |
| TSET (%)| 12.0  | 69.5   | 7.6    | 16.2  | 66.59  | 7.3    |
| PR      | 2.61  | 0.90   | 2.63   | 2.04  | 1.0    | 2.75   |
| DW (nm) | 513.8 | 515.8c | 510.5  | 486.3 | 593.75 | 494.2  |
| Pe      | 11.13 | 21.12  | 0.87   | 35.81 | 38.8   | 2.28   |
| L*      | 65.0  | 80.2   | 51.7   | 69.7  | 79.49  | 51.9   |
| a*      | −27.01| 30.97  | 0.14   | −28.92| 33.56  | −0.47  |
| b*      | 11.24 | −13.02 | 0.28   | −18.00| 27.40  | −0.45  |
| C*      | 29.26 | 33.59  | 0.32   | 34.06 | 43     | 0.65   |
| H°      | 157   | 337    | 63     | 212   | 39     | 224    |

The present invention may also be used to produce what is commonly referred to as privacy glazing which typically has an LTA≦50% and preferably ≦35%. More particularly, referring to Table 3, composite transparency 70 represents a dark gray transparency incorporating a green substrate having a hue angle of 157° and a purple interlayer having a hue angle of 337° which complements the hue angle of the green substrate. Composite transparency 72 represents a dark gray transparency incorporating a blue substrate having a hue angle of 212° and an orange interlayer having a hue angle of 39° which generally complements the hue angle of the blue substrate. As shown in Table 3, both the composites have an LTA of 20% and the performance ratios for composite transparencies 70 and 72 are 2.63 and 2.75, respectively, indicating a low amount of total solar energy transmittance with respect to this level of luminous transmittance.

TABLE 4

|         | Comp. Trans. 74 |        |        | Comp. Trans. 76 |        |        | Comp. Trans. 78 |        |        |
|---------|-------|--------|--------|-------|--------|--------|-------|--------|--------|
|         | Glass | PVB    | Trans. | Glass | PVB    | Trans. | Glass | PVB    | Trans. |
| t (in.) | 0.378 | 0.030  | 0.408  | 0.378 | 0.030  | 0.408  | 0.270 | 0.030  | 0.300  |
| LTC (%) | 58.7  | 74.8   | 47.4   | 60.8  | 72.0   | 45.8   | 70.4  | 60.2   | 46.2   |
| TSET (%)| 27.1  | 79.9   | 22.7   | 27.3  | 76.1   | 19.6   | 43.3  | 73.5   | 32.5   |
| PR      | 2.17  | 0.94   | 2.10   | 2.23  | 0.95   | 2.34   | 1.63  | 0.82   | 1.42   |
| DW (nm) | 512.3 | 513.8c | 502.4  | 487.3 | 594.1  | 493.7  | 559.8 | 563.7c | 511.8  |
| Pe      | 5.07  | 10.11  | 0.72   | 18.82 | 17.69  | 1.37   | 10.3  | 10.5   | 0.52   |
| L*      | 81.3  | 89.0   | 74.3   | 82.9  | 87.1   | 73.2   | 87.0  | 82.0   | 73.5   |
| a*      | −15.20| 15.64  | −0.46  | −17.41| 18.20  | −0.52  | −9.47 | 9.15   | −0.66  |
| b*      | 6.11  | −6.25  | 0.18   | −10.34| 12.50  | −0.34  | 12.1  | −12.2  | 0.42   |
| C*      | 16.38 | 16.85  | 0.49   | 20.25 | 22.08  | 0.62   | 15.4  | 15.2   | 0.78   |
| H°      | 158   | 338    | 159    | 211   | 34     | 214    | 128   | 307    | 147    |

The present invention may also be used in architectural applications which incorporate laminated, coated or spaced apart plies. More particularly, referring to Table 4, composite transparency 74 represents a gray transparency incorporating a green substrate having a hue angle of 158° and a purple interlayer having a hue angle of 338° which complements the hue angle of the green substrate. Composite transparency 76 represents a gray transparency incorporating a blue substrate having a hue angle of 211° and an orange interlayer having a hue angle of 34° which generally complements the hue angle of the blue substrate. Composite transparency 78 represents a gray transparency incorporating a greenish-yellow substrate having a hue angle of 128° and a violet interlayer having a hue angle of 307° which generally complements the hue angle of the substrate. In architectural glazing applications, the luminous transmittance is based on CIE standard illuminant "C" (LTC) and 2° observer. As shown in Table 4, the performance ratios (based on LTC) for composite transparencies 74, 76 and 78 are 2.10, 2.34 and 1.42, respectively.

The present invention provides the ability to fabricate composite transparencies with customized colors and a high performance ratio without having to change the base glass composition. In addition, the color intensity of the composite transparency may be controlled so that the color of the transparency is more neutral as compared to the substrate, and if desired, to produce a high performance, solar control gray composite transparency.

The present invention also provides a system whereby high performance, solar control glass substrates which are outside desired color tolerances may be combined with custom tinted plastic layers or coatings to provide a transparency having the desired color and intensity and further have a high performance ratio.

Other variations as would be known to those skilled in the art based on the disclosure herein may be resorted to without departing from the scope of the invention as defined by the claims that follow.

We claim:

1. A composite transparency, comprising:
   an infrared absorbing substrate having a major surface, an LTA, a TSET, and a color, the color of the substrate defined by a hue angle, C* and L* in the CIELAB color system, wherein the substrate has an equivalent C* value exceeding 4 at an L*=88;

a sheet having opposed major surfaces, an LTA, a TSET, and a color, the color of the sheet defined by a hue angle, C* and L* in the CIELAB color system, wherein the color of the sheet is complementary to the color of the substrate, and the major surface of the substrate is in a fixed facing relationship to one of the major surfaces of the sheet to provide a laminated structure, and wherein the laminated structure has (a) an LTA, (b) a TSET, (c) a ratio of LTA to TSET of at least 1.4, (d) a color defined by a hue angle, C* and L* in the CIELAB color system, (e) an equivalent C* value not exceeding 4 at an L*=88, and (f) a color different than the color of at least one of the substrate and sheet.

2. The transparency as in claim 1 wherein said sheet is a coating applied to said major surface of said substrate.

3. The transparency as in claim 1 wherein said sheet is a flexible plastic ply.

4. The transparency as in claim 3 wherein said flexible ply has a coating on at least one of the major surfaces.

5. The transparency as in claim 3 wherein said flexible ply is a tinted polyvinyl butyral ply.

6. The transparency as in claim 5 wherein said substrate is a first glass substrate and further including a second glass substrate, the major surface of the first glass substrate secured to a major surface of said sheet and the second glass substrate secured to the other major surface of the sheet.

7. The transparency as set forth in claim 6 wherein the first and second substrates and the sheet are the transparency.

8. The transparency as in claim 7 wherein the first glass substrate has an L* value of 88 and a C* value exceeding 4 and said transparency has an L* value of 88 and a C* value not exceeding 4.

9. The transparency as in claim 8 wherein said transparency has an LTA value of at least 70%.

10. The transparency as in claim 9 wherein said transparency has a ratio of LTA to TSET of at least 1.55.

11. The transparency as in claim 9 wherein the transparency is an automotive windshield.

12. The transparency as in claim 6 wherein said first glass substrate has a hue angle from 120°–200°.

13. The transparency as in claim 12 wherein said first glass substrate has a hue angle from 140°–190°.

14. The transparency as in claim 6 wherein said first glass substrate has a hue angle from 200°–300°.

15. The transparency as in claim 14 wherein said first glass substrate has a hue angle from 200°–240°.

16. The transparency as in claim 1 wherein said transparency has a neutral gray color and an equivalent C* value of no greater than 4 at L*=88.

17. The transparency as in claim 16 wherein said sheet is a flexible plastic ply.

18. The transparency as in claim 16 wherein said substrate is a blue color and said sheet is a complementing orange color.

19. The transparency as in claim 16 wherein said substrate is a green color and said sheet is a generally complementing purple color.

20. The transparency as in claim 16 wherein said transparency has an LTA value of at least 70%.

21. The transparency as in claim 16 wherein said transparency has a TSET value of no greater than 50%.

22. A composite transparency, comprising:

an infrared absorbing substrate having a major surface, an LTA, a TSET, and a color defined by a hue angle, C* and L* in the CIELAB color system, wherein the C* value at the said L* value is greater than 4;

a sheet having opposed major surfaces, an LTA, a TSET, and a color defined by a hue angle, C* and L* in the CIELAB color system, wherein the color of the sheet is complementary to the color of the substrate, and the major surface of the substrate is in a fixed facing relationship to one of the major surfaces of the sheet to provide laminated structure, and wherein the laminated structure has (a) an LTA, (b) a TSET, (c) a ratio of LTA to TSET of at least 1.4, (d) a color defined hue angle, C* and L* in the CIELAB color system, (e) the color of the laminated structure different than the color of at least one of the substrate and sheet, and (f) the laminated structure having a C* value not exceeding 4 at the said L* in the CIELAB color system of the laminated structure.

23. The transparency as in claim 22 wherein said ratio of LTA to TSET is at least 1.55.

24. The transparency as in claim 22 wherein at least one of said glass substrate is a blue color and said sheet is a complementing orange color.

25. The transparency as in claim 22 wherein at least one of said glass substrate is a green color and said sheet is a complementing purple color.

26. The transparency as set forth in claim 22 wherein the substrate is a glass substrate and the laminated structure has an L* of 88.

27. The transparency as set forth in claim 26 wherein the laminate structure is the transparency and the transparency is an automotive windshield.

28. The windshield as in claim 27 wherein said windshield has a ratio of LTA to TSET of at least 1.55.

29. The windshield as in claim 27 wherein at least one of said glass plies has a hue angle from 120°–200°.

30. The windshield as in claim 29 wherein at least one of said glass plies has a hue angle from 140°–190°.

31. The windshield as in claim 27 wherein at least one of said glass plies has a hue angle from 200°–300°.

32. The windshield as in claim 31 wherein at least one of said glass plies has a hue angle from 200°–240°.

33. The windshield as in claim 26 wherein the glass substrate is a first glass substrate, the sheet is a sheet of polyvinyl butyral and further includes a second glass substrate having a major surface wherein the major surface of the first sheet is secured to a major surface of the sheet and the major surface of the second substrate is secured to the second major surface of the sheet.

34. The windshield as in claim 33 wherein at least one of the substrates has a blue color and the sheet has a complementary orange color.

35. The windshield as in claim 33 wherein at least one of the substrate has a green color and the sheet has a complementary purple color.

36. A composite transparency, comprising:

an infrared absorbing substrate having a major surface, an LTA, a TSET, a color defined by hue angle, C* and L* in the CIELAB system, where the C* value at the said L* value is greater than 4;

a color modifying member having a major surface, an LTA, a TSET and a color defined by a hue angle, C* and L* in the CIELAB color system, wherein the color of the member is complementary to the color of the substrate, the major surface of the member adhered to the major surface of the substrate to provide the composite transparency, the composite transparency having (a) a ratio of LTA to TSET of at least 1.4, (b) a color defined hue angle, C* and L* in the CIELAB color system, (c) a color different than the color of at least one of the substrate and the member, and (d) an equivalent C* value not exceeding 4 at an L* of 88 in the CIELAB color system.

37. The composite transparency as in claim 36 wherein the composite transparency has an L* value of 88.

38. A method of making a composite transparency, comprising:

provniding an infrared absorbing substrate having a major surface, an LTA, and a TSET, the substrate further having a color defined by a hue angle, C* and L* in the CIELAB color system, wherein the C* value at the said L* value is greater than 4;

providing a sheet having opposed major surfaces, an LTA, a TSET, a color defined by a hue angle, C* and L* in the CIELAB color system, wherein the color of the sheet is complementary to the color of the substrate; and securing the major surface of the substrate in a fixed facing relationship to one of the major surfaces of the sheet to provide a laminated structure having (a) an LTA, (b) a TSET, (c) a ratio of LTA to TSET of at least 1.4, (d) a color defined by a hue angle, C* and L* in the CIELAB color system, (e) a color different than the color of at least one of the substrate and sheet, and (f) an equivalent C* value not exceeding 4 at an L* of 88.

39. The method of claim 38 wherein the sheet is a coating, and the securing step is practiced by applying the coating to the major surface of the substrate.

* * * * *